US010190439B2

(12) United States Patent
Korshikov et al.

(10) Patent No.: US 10,190,439 B2
(45) Date of Patent: Jan. 29, 2019

(54) FRANGIBLE MOUNTING ARRANGEMENT AND METHOD FOR PROVIDING SAME

(71) Applicant: Pratt & Whitney Canada Corp., Longueuil (CA)

(72) Inventors: Oleg Korshikov, Oakville (CA); Czeslaw Wojtyczka, Brampton (CA); David Denis, Burlington (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 969 days.

(21) Appl. No.: 14/259,558

(22) Filed: Apr. 23, 2014

(65) Prior Publication Data
US 2015/0308286 A1 Oct. 29, 2015

(51) Int. Cl.
*F01D 21/04* (2006.01)
*F16B 31/02* (2006.01)
*F01D 25/16* (2006.01)
*F16P 5/00* (2006.01)

(52) U.S. Cl.
CPC ...... *F01D 21/045* (2013.01); *F05D 2260/311* (2013.01)

(58) Field of Classification Search
CPC ........ F01D 21/045; F01D 21/04; F01D 25/16; F16B 31/02; F05D 2260/311; F16P 5/00
USPC .......................... 415/9; 384/114, 445; 403/2
See application file for complete search history.

(56) References Cited

U.S. PATENT DOCUMENTS

| 3,395,857 | A | * | 8/1968 | Pask | F01D 21/045 |
| | | | | | 384/114 |
| 6,164,658 | A | | 12/2000 | Collin | |
| 6,428,269 | B1 | | 8/2002 | Boratgis et al. | |
| 6,827,548 | B2 | | 12/2004 | Coxhead et al. | |
| 7,025,560 | B2 | | 4/2006 | Clark | |
| 7,237,959 | B2 | * | 7/2007 | Bouchy | F01D 21/045 |
| | | | | | 384/445 |
| 7,318,685 | B2 | | 1/2008 | Bouchy et al. | |
| 7,452,152 | B2 | * | 11/2008 | Bouchy | F01D 21/045 |
| | | | | | 403/2 |
| 9,777,596 | B2 | | 10/2017 | Raykowski et al. | |
| 2013/0149139 | A1 | * | 6/2013 | Wallace | F01D 21/04 |
| | | | | | 415/214.1 |
| 2015/0176431 | A1 | | 6/2015 | Raykowski et al. | |
| 2015/0308286 | A1 | | 10/2015 | Korshikov et al. | |

* cited by examiner

*Primary Examiner* — Mark Laurenzi
*Assistant Examiner* — Paul Thiede
(74) *Attorney, Agent, or Firm* — Norton Rose Fulbright Canada, L.L.P.

(57) ABSTRACT

A frangible mounting arrangement between a bearing and a bearing support in a gas turbine engine comprises a plurality of frangible bolts connecting mounting flanges of the bearing and the bearing support. The bolts are disposed on a circle. A distance on the circle between a first pair of adjacent bolts is greater than a distance on the circle between a second pair of adjacent bolts. The bolts are configured to break when subjected to a breaking load above a predetermined value. The breaking load results from at least one of a bending moment and a shear load on the mounting flanges. When subjected to the breaking load, the first pair of adjacent bolts breaks before the second pair of adjacent bolts. A method of providing a frangible mounting arrangement between a bearing and a bearing support is also provided.

13 Claims, 7 Drawing Sheets

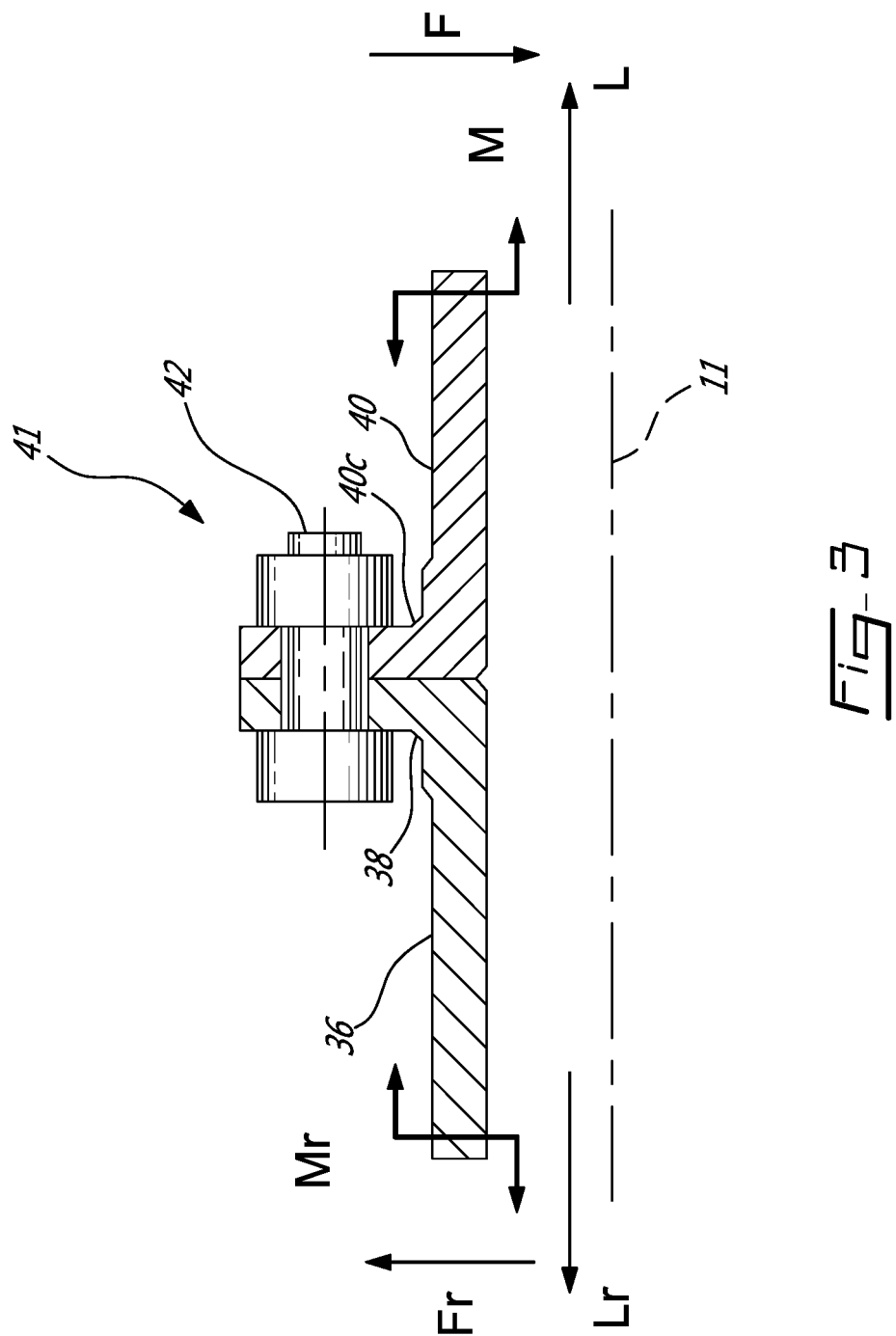

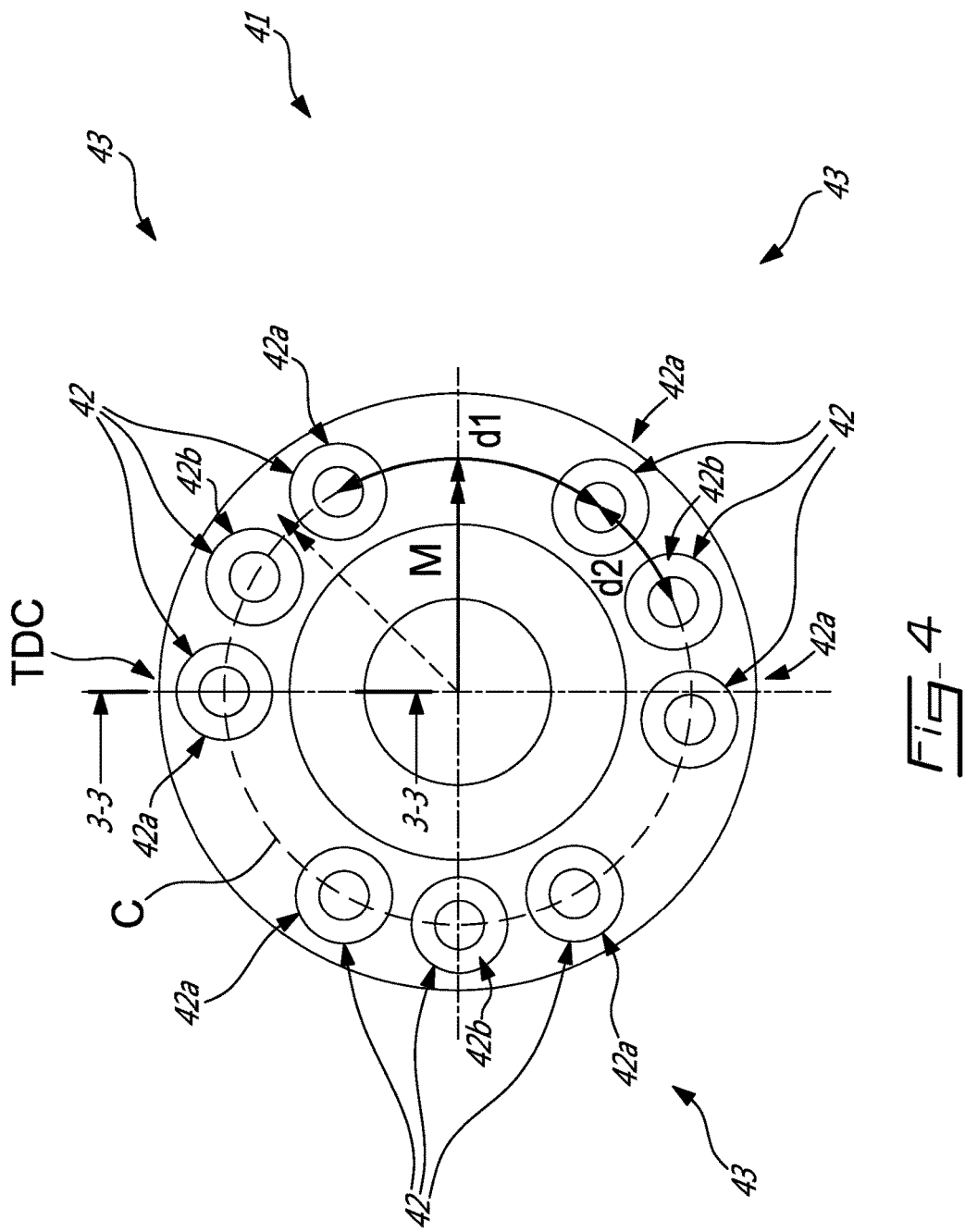

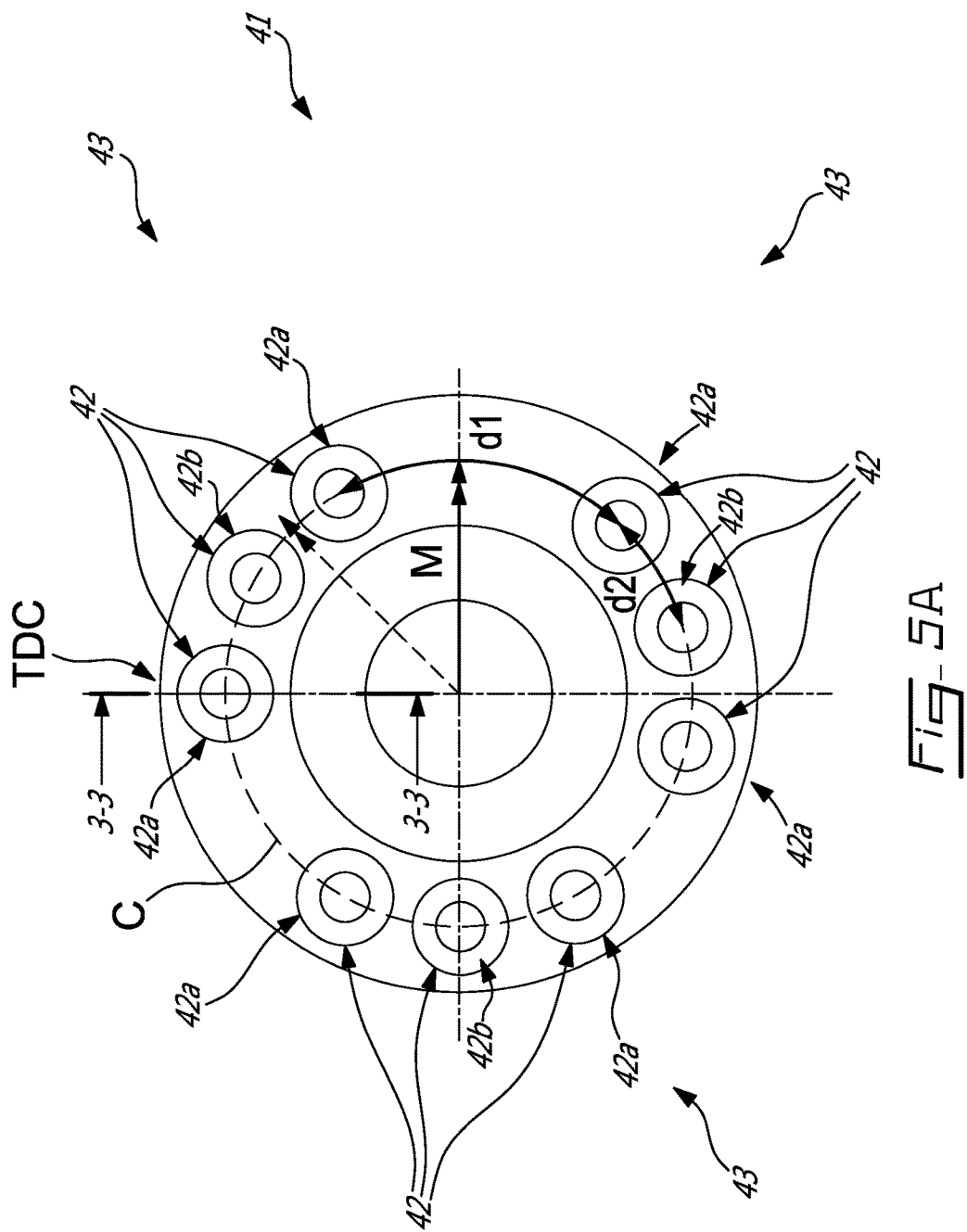

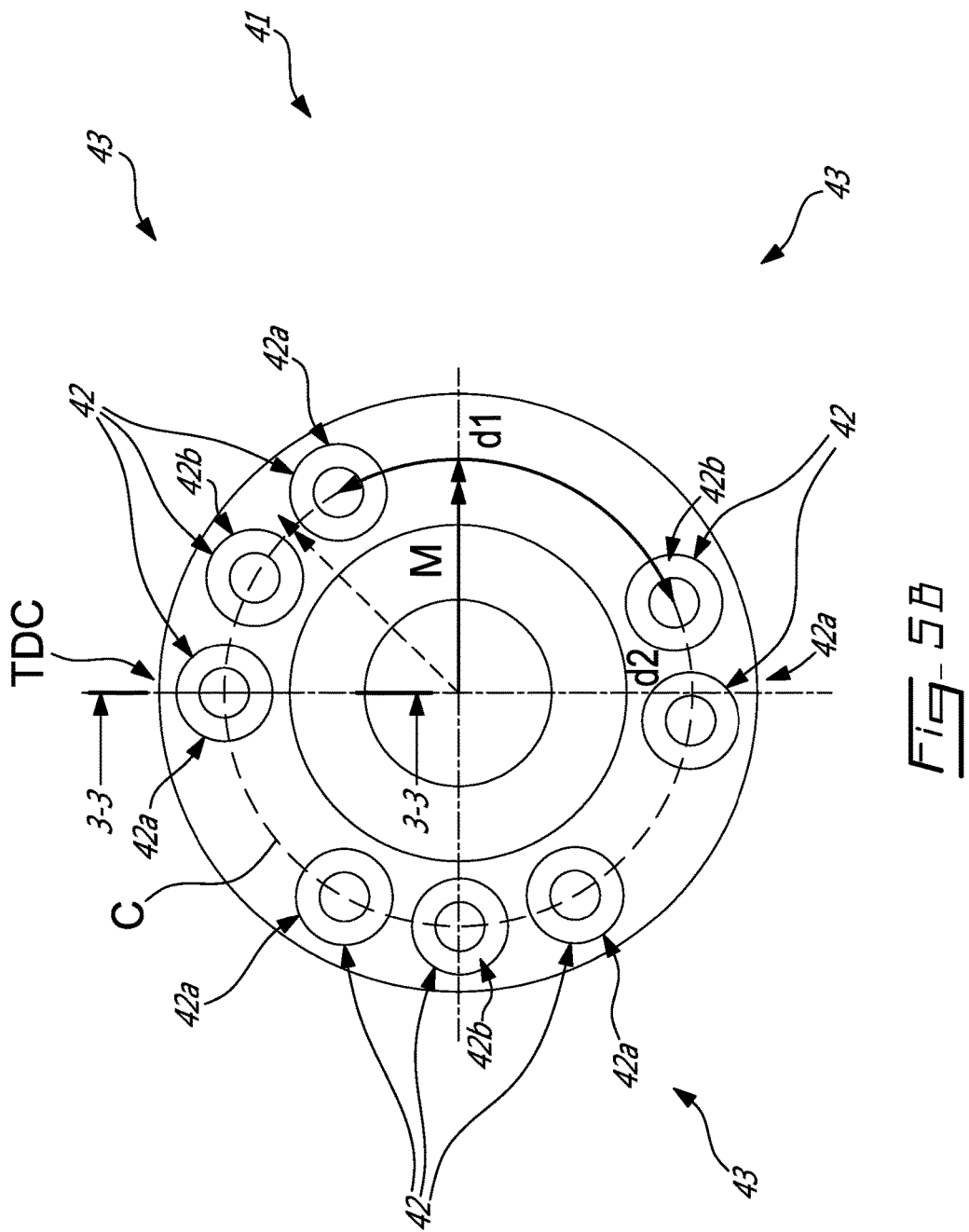

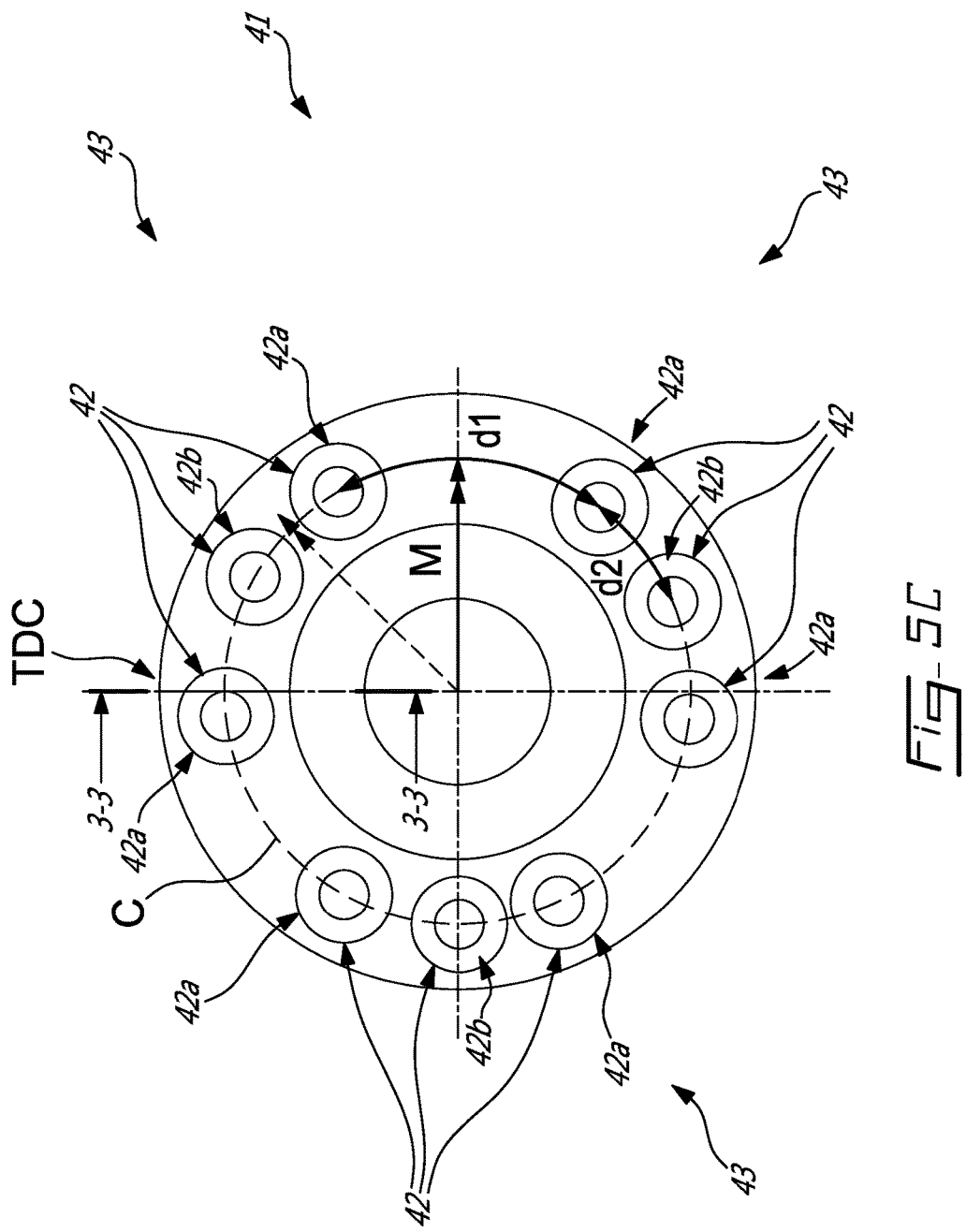

FRANGIBLE MOUNTING ARRANGEMENT AND METHOD FOR PROVIDING SAME

TECHNICAL FIELD

The application relates generally to aircraft engines and, more particularly, to bearing support arrangements for spinning rotors in an aircraft engine.

BACKGROUND OF THE ART

The fans of aircraft engines are designed to resist damage caused by foreign object ingestion. However, in certain circumstances, a fan may be damaged to such an extent that parts of one or more of the fan blades become detached from the rotor disk (referred to herein as a fan blade off event or FBO event). This may result in a significant imbalance requiring shutdown of the engine to minimise load transmission to the aircraft. The imbalance in the fan created by the blade loss generates extremely high radial loads which must at least be partially absorbed as the engine is run down to windmilling speed (i.e. the speed at which the rotor spins in a non-operative condition as a result of the aircraft moving through the air).

Under certain circumstances, the vibration resulting from the fan imbalance at windmilling speed can still be considerable. If not appropriately controlled, these vibrations may damage the engine structure and the aircraft and may result in difficulties to control the aircraft during approach.

SUMMARY

In one aspect, there is provided a frangible mounting arrangement between a bearing and a bearing support in a gas turbine engine, the arrangement comprising: a plurality of frangible bolts connecting mounting flanges of the bearing and the bearing support, the plurality of frangible bolts being disposed on a circle, a distance on the circle between a first pair of adjacent frangible bolts being greater than a distance on the circle between a second pair of adjacent frangible bolts, the frangible bolts being resistant to axial loads and being configured to break when subjected to a breaking load above a predetermined value, the breaking load resulting from at least one of a bending moment and a shear load on the mounting flanges, and when subjected to the breaking load, the first pair of adjacent frangible bolts breaking before the second pair of adjacent frangible bolts.

In another aspect, there is provided a frangible mounting arrangement between a bearing and a bearing support, the arrangement including: a plurality of identical frangible bolts connecting mounting flanges of the bearing and the bearing support, the frangible bolts breaking above a selected breaking load, the breaking load resulting from at least one of a bending moment and a shear load on the mounting flanges, the frangible bolts being irregularly spaced about a circumference of the mounting flanges such that a circumferential spacing between a first and a second adjacent bolts is greater than a circumferential spacing between the second and a third adjacent bolts.

In a further aspect, there is provided a method of providing a frangible mounting arrangement between a bearing and a bearing support in a gas turbine engine, the method comprising: connecting the mounting flanges of the bearing and the bearing support with first and second groups of frangible bolts, the frangible bolts of the first and second groups being disposed on a circle, adjacent frangible bolts belonging to a same group being at a first distance on the circle from each other, adjacent frangible bolts belonging each to one of the first and second groups being at a second distance on the circle, the second distance being larger than the first distance, the frangible bolts being resistant to axial loads and being configured to break when subjected to a breaking load above a predetermined value, the breaking load resulting from at least one of a bending moment and a shear load on the mounting flanges, the adjacent frangible bolts being at the second distance from each other breaking first.

DESCRIPTION OF THE DRAWINGS

Reference is now made to the accompanying figures in which:

FIG. 3 is a partial axial section view of the frangible bearing arrangement; and FIG. 4 is a cross-sectional view of the frangible bearing arrangement.

FIGS. 5A-5C illustrate various bolting patterns.

DETAILED DESCRIPTION

Figure 1:
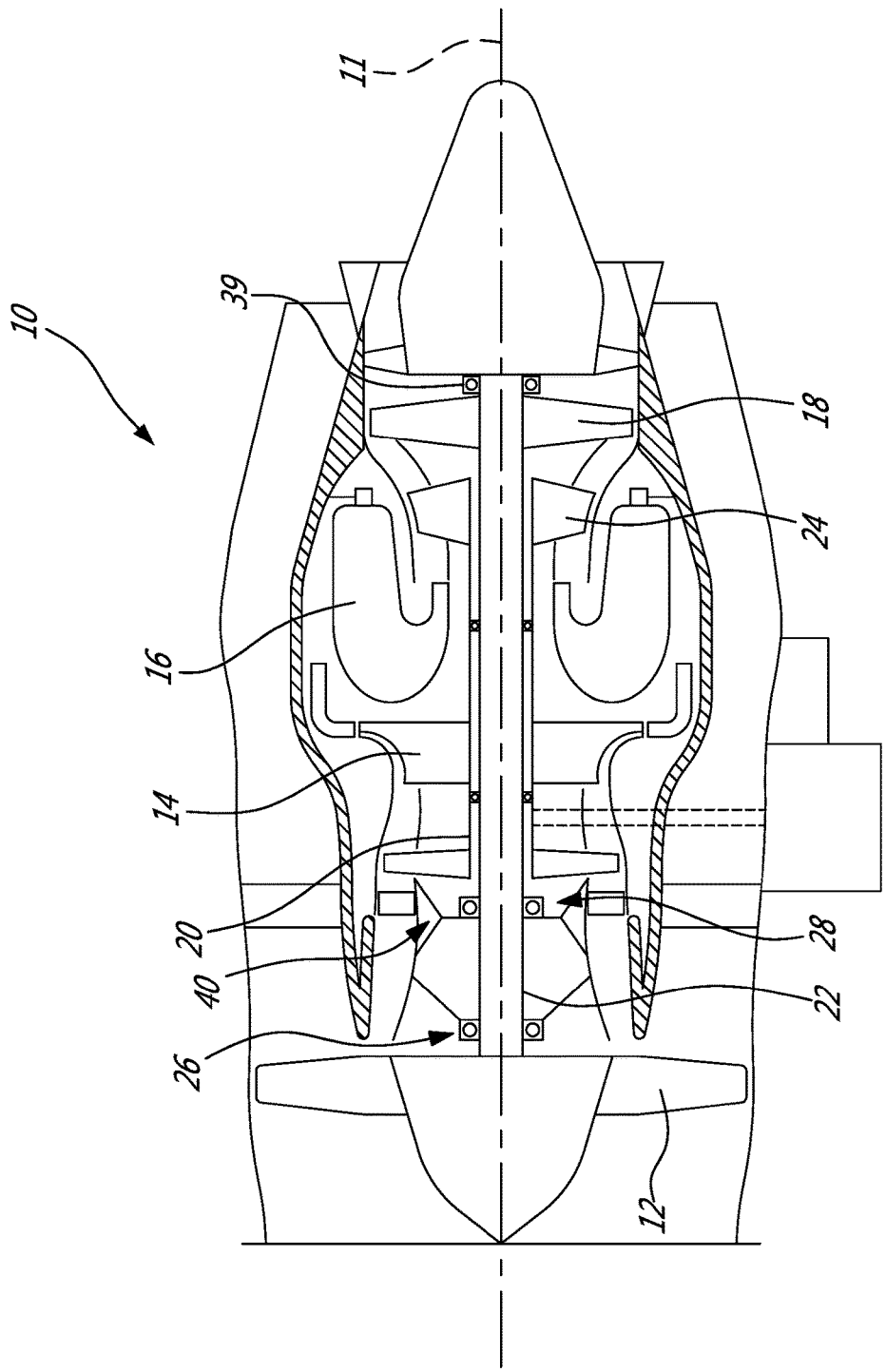
FIG. 1 is a schematic cross-sectional view of a turbofan gas turbine engine having a frangible bearing support arrangement.

FIG. 1 illustrates a turbofan gas turbine engine 10 of a type preferably provided for use in subsonic flight and generally comprising a low pressure spool assembly, which includes a fan assembly 12, a low pressure compressor assembly (not shown) and a low pressure turbine assembly 18 connected by a low pressure shaft 22, and a high pressure spool assembly, which includes a high pressure compressor assembly 14 and a high pressure turbine assembly 24 connected by a high pressure shaft 20. The engine 10 further comprises a combustor 16 in which compressed air from the high pressure compressor 14 is mixed with fuel and ignited for generating an annular stream of hot combustion gases from which the low pressure and high pressure turbine sections extract energy, as known in the art.

The low pressure spool is rotatably supported by a number of axially spaced-apart bearings concentrically mounted about the central axis 11 of the engine 10. The low pressure shaft 22 is supported at its front or upstream end by first and second bearings 26 and 28 respectively commonly referred to as the #1 and #2 bearings and at a rear end thereof by a third bearing 39 which may be the #5 bearing of the engine (the #3 and #4 bearings rotatably supporting the high pressure shaft 20). The bearing arrangement for a particular engine, including but not limited to the number and type of bearings selected, is typically determined by a number of factors specific to that engine. The bearing arrangement described herein is exemplary only, and not intended to be limiting. In this example, the forward and rearward most bearings, i.e. the #1 and #5 bearings, may be roller bearings for radially supporting the low pressure shaft 22. The #2 bearing 28 may be a thrust bearing to provide both axial and radial support to the low pressure shaft 22. As shown in FIG. 1, the first bearing 26 is disposed adjacent the fan rotor, while the #2 bearing 28 is disposed adjacent to and downstream from the first bearing 26, and upstream of the high pressure compressor 14 relative to a flow direction of the gases through the engine 10. The bearings and supporting structure flanges may be arranged in any suitable fashion in the context of the present application.

The first bearing 26 is supported on the stator structure of the engine by a bearing support 27. To minimize the effect of potentially damaging abnormal imbalance loads (e.g. such as caused by fan blade-off-induced imbalance loads), the bearing support 27 is designed to frange when subject to a predetermined critical load.

Figure 2:
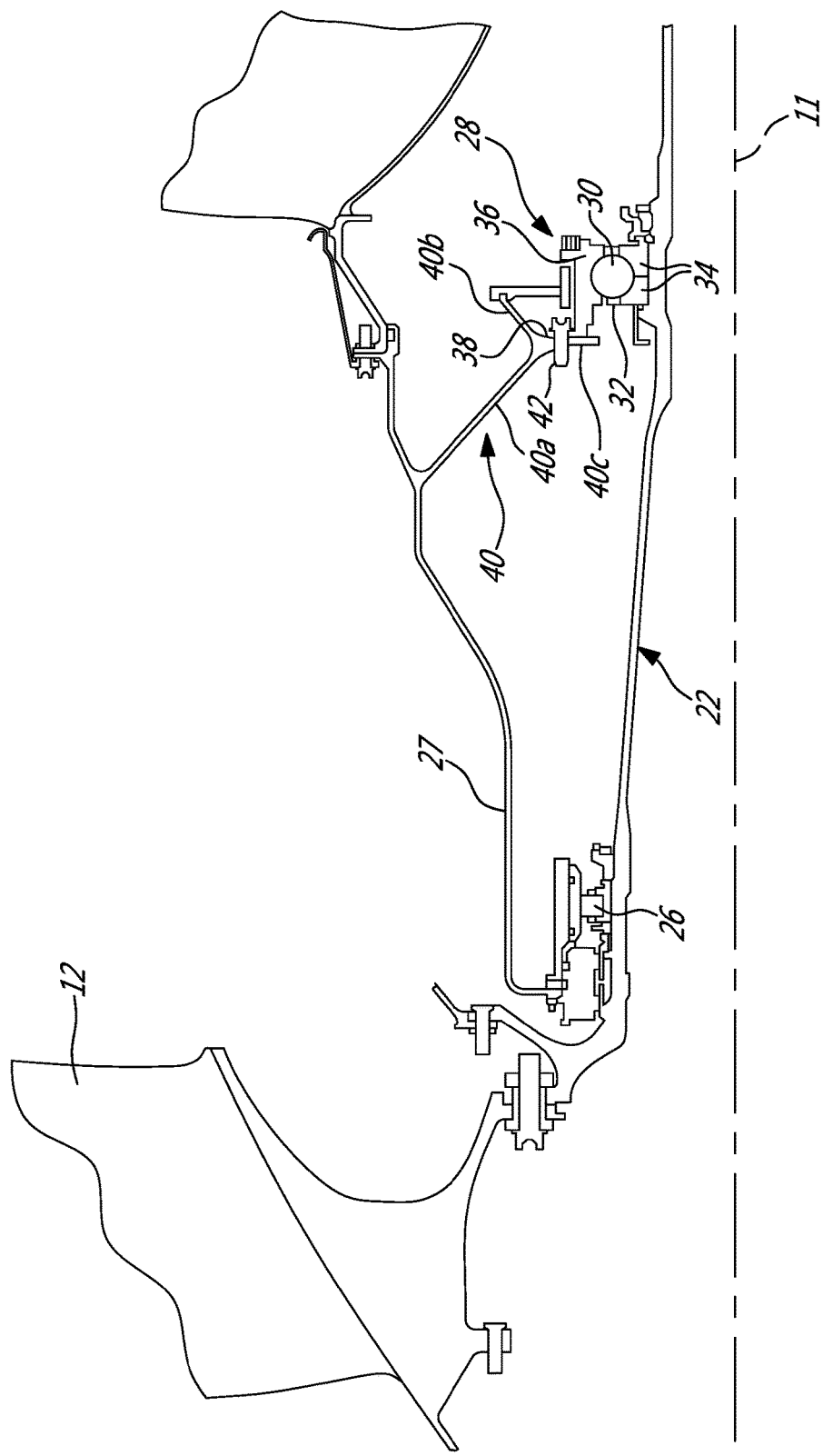
FIG. 2 is an axial section view of the frangible bearing arrangement with a thrust bearing bumper.

As shown in FIG. 2, the #1 bearing support 27 may be provided in the form of a fusible conical structure connected to an outer race of the #1 bearing. The fusible conical structure is adapted to fail when subject to a critical loading condition to thereby decouple the #1 bearing 26 from the stator structure of the engine 10. The fusible conical structure decouples the #1 bearing from the static structure of the engine by buckling, collapsing, crimping, yielding or fracturing. The net result is that the radial support provided to the #1 bearing is either eliminated or reduced to a negligible value.

Referring to FIG. 2, it can be seen that the #2 bearing 28 may be provided in the form of a thrust bearing having rolling elements 30 (e.g. ball bearing elements) retained by a bearing cage 32 and disposed between inner and outer races 34, 36. The inner race 34 is securely mounted to the low pressure shaft 22. According to the illustrated embodiment, the inner race 34 consists of two half-races (not shown). However, it is understood that the inner race 34 could be provided as a one-piece component or other suitable configuration. The outer race 36 has a mounting flange 38 projecting radially outwardly from the front end thereof for connection to the #2 bearing support 40 forming part of the stator structure of the engine case. The bearing support 40 has a Y-shaped cross-section including first and second axially opposed frusto-conical portions 40a, 40b flaring away from each other and an annular mounting flange 40c projecting radially inwardly from the junction of the first and second frusto-conical portions 40a, 40b. The mounting flange 40c is provided at its inner diameter with an axially rearwardly projecting spigot (not shown) over which the front end portion of the outer race 36 of bearing 28 is adapted to be axially slid when loaded in position from the rear end of the engine 10.

Referring to FIGS. 3 and 4, a mounting arrangement 41 includes a series of frangible fasteners, such as fusible or shear bolts 42 or the like, which may be used to fasten the mounting flange 38 of the outer race 36 to the corresponding mounting flange 40c of the bearing support 40. In use, the frangible bolts 42 may fracture for structurally decoupling the #2 bearing 28 from the stator structure of the engine case, and are sized so that decoupling at the #2 bearing 28 preferably occurs after decoupling at the #1 bearing 26, thereby preventing the transmission of potentially damaging imbalance forces or other vibratory forces to the engine case and the airframe in the event of a fan blade loss or another abnormal fan rotor imbalance event. It is understood that the frangible bolts 42 are not the only possible type of decoupler. Other suitable types of decoupler could be used as well. For instance, a fusable flange or frangible support could be used to disconnect the bearing from the engine case.

In the illustrated embodiment, the frangible bolts 42 have a weakened zone (not shown) to cause the bolts to fracture when subject to a breaking load experienced in a failure condition. As mentioned above, the failure condition may correspond to a situation where the fan rotor is imbalanced. The breaking force, depending on connections of the mounting arrangement 41 with other parts of the engine 10 would be resulting from a bending moment M (having a reaction moment Mr) on the mounting flanges 38 and 40c, or a shear load F (having a reaction Fr) on the mounting flanges 38 and 40c or a combination of the two on the mounting flanges 38 and 40c. The bolts 42 are designed to break when the breaking force is above a pre-determined/selected magnitude/value, thereby releasing/decoupling the outer race 36 and, thus, #2 bearing 28 from the static structure of the engine case. The frangible bolts 42 are also designed to not break in normal operation condition. In normal operation condition, the mounting flanges 38 and 40c experience mainly axial loads L (i.e. load perpendicular to the mounting flange 40c), its reaction being Lr. In normal operation condition, the mounting flanges 38 and 40c do not (or very little) experience the bending moment M, the shear load F or the combination of the two.

The mounting flange 38 of the outer race 36 may be connected to the corresponding mounting flange 40c of the bearing support 40 solely by the frangible bolts 42 or by a combination of frangible and non-frangible bolts. In the particular embodiment shown in the Figures, the mounting flange 38 is connected to the corresponding mounting flange 40c solely by the frangible bolts 42, which are distributed on a circle C (shown in FIG. 4). The frangible bolts 42 are unevenly circumferentially distributed, i.e. a distance between two adjacent frangible bolts 42 on the circle C is not constant for each adjacent frangible bolts 42 on the circle C. By "adjacent", one should understand immediately preceding or immediately following. The distances discussed herein are circumferential distances taken on the circle C with the extremities corresponding to centres of the frangible bolts 42. The distances will be referred herein as "distance", "distance on the circle" or "circumferential distance". They are thus not shortest distances between two points but rather a length of a portion of the circle C.

The frangible bolts 42 may be grouped into one or more groups 43 of bolts 42. While the frangible bolts 42 may be evenly distributed within each group 43, the groups 43 may be unevenly circumferentially distributed (see FIG. 5A), which results in the frangible bolts 42 being overall unevenly circumferentially distributed. FIG. 4 shows an example of unevenly circumferentially distribution of the frangible bolts 42 but in which the groups are uniformly spaced apart. Nine frangible bolts 42 are arranged in three groups 43 of three frangible bolts 42. Each group 43 includes two extremal frangible bolts 42a and a middle frangible bolt 42b. Extremal frangible bolts 42a are frangible bolts which have an adjacent bolt of the same group 43 and an adjacent bolt of another group 43. Middle frangible bolts 42b are frangible bolts which have two adjacent bolts of the same group 43. A circumferential distance d1 on the circle C between the extremal frangible bolts 42a is greater than a circumferential distance d2 on the circle C between an extremal frangible bolt 42a and a middle bolt 42b. It is contemplated that the groups 43 could include less than three or more than three frangible bolts 42. It is also contemplated that each group 43 could have a different number of frangible bolts 42 (see FIG. 5B). For example, a first group could have two frangible bolts and second and third groups could have four frangible bolts. There may also be only one group 43, as long as at least two adjacent frangible bolts 42 have a distance on the circle C between each other different from that of between the other frangible bolts 42. The distance d1 may vary between the groups or even within a same group of frangible bolts (see FIG. 5C).

When the frangible bolted flange 43 is subjected to, for example, the bending moment M (shown in FIG. 4), the frangible bolts 42 from the side of flange separation experience mainly a tensile load. In case of even spacing of bolts, the bolt loading is proportional to the distance from the bending neutral line. The bolts close to the neutral line are the least loaded and, contrary, the bolts at the maximum distance are the most loaded. In the case shown in FIG. 4, with bending moment vector M directed in horizontal plane, the most loaded bolts 42a are located at the flange TDC (Top Dead Center). The extremal bolts 42a at flange TDC undergo a greater tensile force than the middle bolts 42b due to the greater distance d1 between the extremal bolts 42a compared to the distance d2 between an extremal bolt 42a and a middle bolt 42b. As such, these extremal bolts 42a are the first ones to break. Should the mounting arrangement 41 include a plurality of middle bolts 42b for each group 43, once the extremal bolts 42a break, the middle bolts 42b would break one after the other in a zipper-like phenomenon, i.e., the next two extremal break before middle ones as dictated by a distance between adjacent frangible bolts (those with the greatest distance between them breaking first).

The circumferential distance between adjacent frangible bolts 42 may be set to vary between adjacent frangible bolts 42 in order to define a sequence of failure of the frangible bolts 42. In turn, failure of the mounting arrangement 41 may be controlled in a manner not previously possible. All the bolts of the mounting arrangement 41 may be solely frangible bolts 42 and may fail only at a predetermined load experienced by each frangible bolt 42 which is related to the circumferential distance between adjacent frangible bolts 42. This bolt arrangement allows achieving the design target requirement for decoupling load with minimal effect to durability and, as a result, be cost effective.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A frangible mounting arrangement comprising:
a thrust bearing for carrying axial loads,
a bearing support; and
a plurality of frangible bolts connecting respective mounting flanges of the thrust bearing and the bearing support, the mounting flange of the thrust bearing extending from an outer race of the thrust bearing, the plurality of frangible bolts extending axially and being disposed on a circle and including a first pair of adjacent frangible bolts and a second pair of adjacent frangible bolts, the circle free of bolts between frangible bolts of the first pair of adjacent frangible bolts and free of bolts between frangible bolts of the second pair of adjacent frangible bolts, a distance (d1) on the circle between the frangible bolts of the first pair of adjacent frangible bolts being greater than a distance (d2) on the circle between the frangible bolts of the second pair of adjacent frangible bolts, the plurality of frangible bolts being configured to break when subjected to a same breaking load above a predetermined value, the breaking load resulting from at least one of a bending moment and a shear load on the mounting flanges.

2. The arrangement as defined in claim 1, wherein the arrangement is free of bolts other than the plurality of frangible bolts.

3. The arrangement as defined in claim 1, wherein the plurality of frangible bolts consists of a set of identical bolts.

4. The arrangement as defined in claim 1, wherein the plurality of frangible bolts includes nine frangible bolts grouped in three groups disposed at 120 degrees from each other, the first pair of adjacent frangible bolts corresponding to frangible bolts belonging each to one of two adjacent of the three groups, and the second pair of frangible bolts corresponding to frangible bolts belonging each to a same one of the three groups.

5. A turbofan gas turbine engine comprising a rotor including a shaft coupled to a propulsive fan, a plurality of axially spaced-apart bearing assemblies supporting the shaft on a stator structure of the turbofan gas turbine engine, one of said bearing assemblies having a frangible mounting arrangement as defined in claim 1.

6. A frangible bearing arrangement comprising:
a thrust bearing for carrying axial loads;
a bearing support; and
a plurality of identical frangible bolts connecting respective mounting flanges of the thrust bearing and the bearing support, the mounting flange of the thrust bearing defined by an outer race of the thrust bearing, the frangible bolts extending in an axial direction and breaking above a selected breaking load, the breaking load resulting from at least one of a bending moment and a shear load on the mounting flanges, a circumferential spacing (d1) between a first and a second adjacent bolt of the plurality of frangible bolts is greater than a circumferential spacing (d2) between the second and a third adjacent bolt of the plurality of frangible bolts, wherein the plurality of frangible bolts includes at least nine frangible bolts grouped in three groups, the three groups being at 120 degrees from each other.

7. A turbofan gas turbine engine comprising the frangible mounting arrangement defined in claim 6, and a shaft carrying a fan.

8. The arrangement as defined in claim 6, wherein the plurality of frangible bolts consists of a plurality of identical frangible bolts.

9. A method of mounting a thrust bearing to a bearing support via a frangible mounting arrangement in a gas turbine engine, the thrust bearing mountable to the bearing support via respective mounting flanges, the mounting flange of the thrust bearing extending radially from an outer race thereof relative to a central axis of the gas turbine engine, the method comprising:
connecting the respective mounting flanges of the thrust bearing and the bearing support with at least first and second groups of frangible bolts, the frangible bolts of the at least first and second groups being disposed on a circle, the at least first and second groups being spaced from one another by a first distance (d1) on the circle, the circle free of bolts between the first group and the second group, the first group of frangible bolts being adjacent to the second group of frangible bolts, the frangible bolts within each of the at least first and second groups being spaced by a second distance (d2) on the circle, the second distance (d2) being smaller than the first distance (d1), the frangible bolts of the first and second groups being configured to break when subjected to a breaking load above a same predetermined value, the breaking load resulting from at least one of a bending moment and a shear load on the mounting flanges.

10. The method defined in claim 9, wherein the at least first and second groups comprise a third group of frangible bolts, the method comprising uniformly distributing the first, second and third groups on the circle.

11. The method defined in claim 9, wherein the at least first and second groups comprise a third group of frangible bolts, the method comprising unevenly spacing the first, second and third groups on the circle.

12. The method defined in claim 9, comprising providing different numbers of frangible bolts in the at least first and second groups.

13. The method defined in claim 9, comprising varying the second distance (d2) between the frangible bolts of a same group of the at least first and second groups.

* * * * *